United States Patent

Nakashima et al.

[11] Patent Number: 4,647,753
[45] Date of Patent: Mar. 3, 1987

[54] WELDING METHOD IN AUTOMATIC WELDING MACHINE

[75] Inventors: Seiichiro Nakashima; Nobutoshi Torii, both of Tokyo, Japan

[73] Assignee: Fanuc Ltd., Minamitsuru, Japan

[21] Appl. No.: 841,028

[22] PCT Filed: Oct. 27, 1983

[86] PCT No.: PCT/JP83/00384
§ 371 Date: Jun. 26, 1984
§ 102(e) Date: Jun. 26, 1984

[87] PCT Pub. No.: WO84/01732
PCT Pub. Date: May 10, 1984

Related U.S. Application Data

[63] Continuation of Ser. No. 626,880, Jun. 26, 1984, abandoned.

[30] Foreign Application Priority Data

Oct. 27, 1982 [JP] Japan .................. 57-188739

[51] Int. Cl.⁴ .............................................. B23K 9/12
[52] U.S. Cl. ............................ 219/125.1; 219/130.5; 901/42
[58] Field of Search .......... 219/124.34, 125.1, 125.11, 219/130.5; 901/42

[56] References Cited
U.S. PATENT DOCUMENTS 4,249,062 2/1981 Hozumi et al. .................. 219/124.34
4,390,954 6/1983 Manning .......................... 219/130.5
4,445,022 4/1984 Mori .................................. 219/125.1

FOREIGN PATENT DOCUMENTS

56-160876 12/1981 Japan ................................ 219/125.1

Primary Examiner—Clifford C. Shaw
Attorney, Agent, or Firm—Staas & Halsey

[57] ABSTRACT

A welding method in an automatic welding machine in which welding is performed by impressing a voltage across a wire, which is transported along a welding path by a robot, and a workpiece to produce an arc at the tip of the wire, and transporting the wire tip along the welding path by the robot while the wire is successively laid out in small increments. The method includes storing a number of welding conditions in memory which conditions comprise welding voltage, wire feed speed, preflow duration, crater processing duration and postflow duration selecting prescribed welding conditions by the program, jetting a gas toward the workpiece for the preflow duration; thereafter generating a selected welding voltage and laying out the wire at a selected wire feed speed to start welding. The welding conditions are selected by the program at a welding starting point, and a predetermined welding voltage is generated for the crater processing duration, followed by performing crater processing by laying out the wire at a predetermined wire feed speed, and thereafter performing postflow processing by jetting gas toward the workpiece for the postflow duration; these welding conditions selected by the program at a welding end point.

8 Claims, 8 Drawing Figures

| a | CMU(V) | WF(m/min) | PRD(sec) | PSD(sec) | CFD(sec) |
|---|---|---|---|---|---|
| 001 | 22.0 | 3.0 | 0.5 | 0.7 | 0.5 |
| 002 | 15.5 | 3.8 | 1.0 | 1.0 | 0.5 |
| 003 | 15.0 | 3.5 | 1.0 | 1.0 | 0.5 |
| 004 | 22.5 | 5.9 | 1.0 | 1.0 | 0.5 |
| 005 | ---- | ---- | ---- | ---- | ---- |
| ---- | ---- | ---- | ---- | ---- | ---- |

Fig. 2

WELDING METHOD IN AUTOMATIC WELDING MACHINE

This is a continuation of co-pending application Ser. No. 626,880 filed on June 26, 1984, now abandoned.

BACKGROUND OF THE INVENTION

This invention relates to a welding method in an automatic welding machine and, more particularly, to a welding method well-suited for use in selecting the welding conditions for an automatic welding machine, the motion of which is controlled by a robot.

Figure 1:
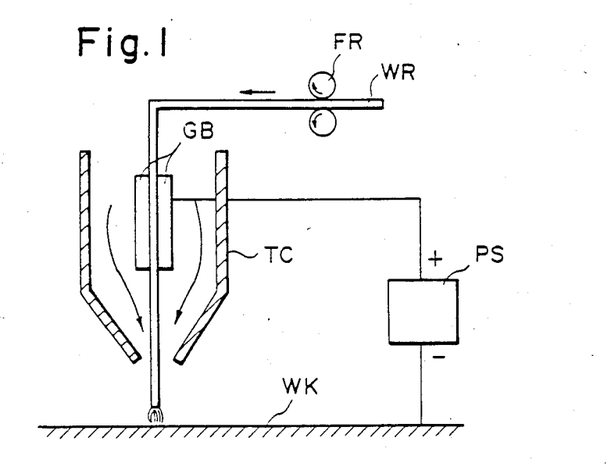
FIG. 1 schematically illustrates an automatic welding machine.

Welding machines are available in which welding is performed by impressing a voltage across a wire and a workpiece to produce an arc at the tip of the wire, where the wire tip is moving along a welding path while the wire is successively laid out in small increments. FIG. 1 is a simplified view of such a welding machine, in which a wire WR is laid out in small increments in the direction of the arrows from feed rollers FR to protrude from the end of a torch TC via guide member GB. The amount by which the wire WR is fed is controlled in such a manner that the tip of the wire is situated at a position spaced a predetermined distance (e.g., 15 mm) from the surface of the workpiece WK. The plus side of a welding power supply PS for generating an intermittent high voltage having a predetermined period is applied to the wire WR through the guide member GB, and the minus side of the high-voltage power supply is applied to the workpiece WK. Gas from a gas supply unit (gas bombe), which is not shown, is supplied through the interior or the torch TC in the direction of the arrows so as to impinge upon the portion of the workpiece being welded to prevent the oxidation thereof. When a high voltage is generated intermittently by the welding power supply PS while the gas is fed from the gas supply unit and the wire is laid out in small increments, an arc is produced at the tip of the wire and both the wire and the portion being welded are melted to weld the fused portions together.

In a welding machine of this type, welding conditions such as optimum welding voltage, wire feed speed, preflow duration, postflow duration and crater processing duration are decided in dependence upon the wire material and the material of the workpiece portion being welded, welding speed and the like. Accordingly, when conventionally welding, the optimum welding conditions are set on dials or the like and welding is performed based on the set welding conditions. However, since the welding voltage, wire delivery speed, preflow duration, postflow duration and crater processing duration must be set using the dials or the like, drawbacks are encountered in that setting of the welding conditions is complicated and changing welding conditions cannot be performed in a simple manner. Furthermore, in a case where the welding conditions differ at the start and at the completion of welding, the welding conditions must be set on the dials for each occasion, thereby rendering the operation of setting the welding conditions even more troublesome. Moreover, a large number of dials are required, thereby raising the cost of the welding machine.

SUMMARY OF THE INVENTION

Accordingly, an object of the present invention is to provide a welding method whereby desired welding conditions can be selected without setting welding conditions on dials.

Another object of the present invention is to provide a welding method in an automatic welding machine, wherein welding voltage, wire delivery speed, preflow duration, postflow duration and crater processing duration are treated as one set of welding conditions, a number of sets of these welding conditions are stored in a memory, and welding voltage, wire delivery speed, preflow duration, postflow duration and crater processing duration can be selected merely by specifying the name of the desired welding condition.

Still another object of the present invention is to provide a welding method in an automatic welding machine, which reduces the cost of welding machines because dials are not used.

The present invention provides a welding method for an automatic welding machine in which welding is performed by impressing a voltage across a wire (which is transported along a welding path by a robot), and a workpiece to produce an arc at the tip of the wire, and in which the wire tip is moved along the welding path by the robot while the wire is successively laid out in small increments. The method includes storing a number of welding conditions in a memory; specifying prescribed welding conditions by a program; and performing welding by reading specified welding conditions out of the memory and controlling the welding machine based on the welding conditions. According to the present invention, welding conditions need not be set on dials. This facilitates easy setting of welding conditions and reduces the cost of welding machines.

DESCRIPTION OF THE PREFERRED EMBODIMENT

Figure 2:
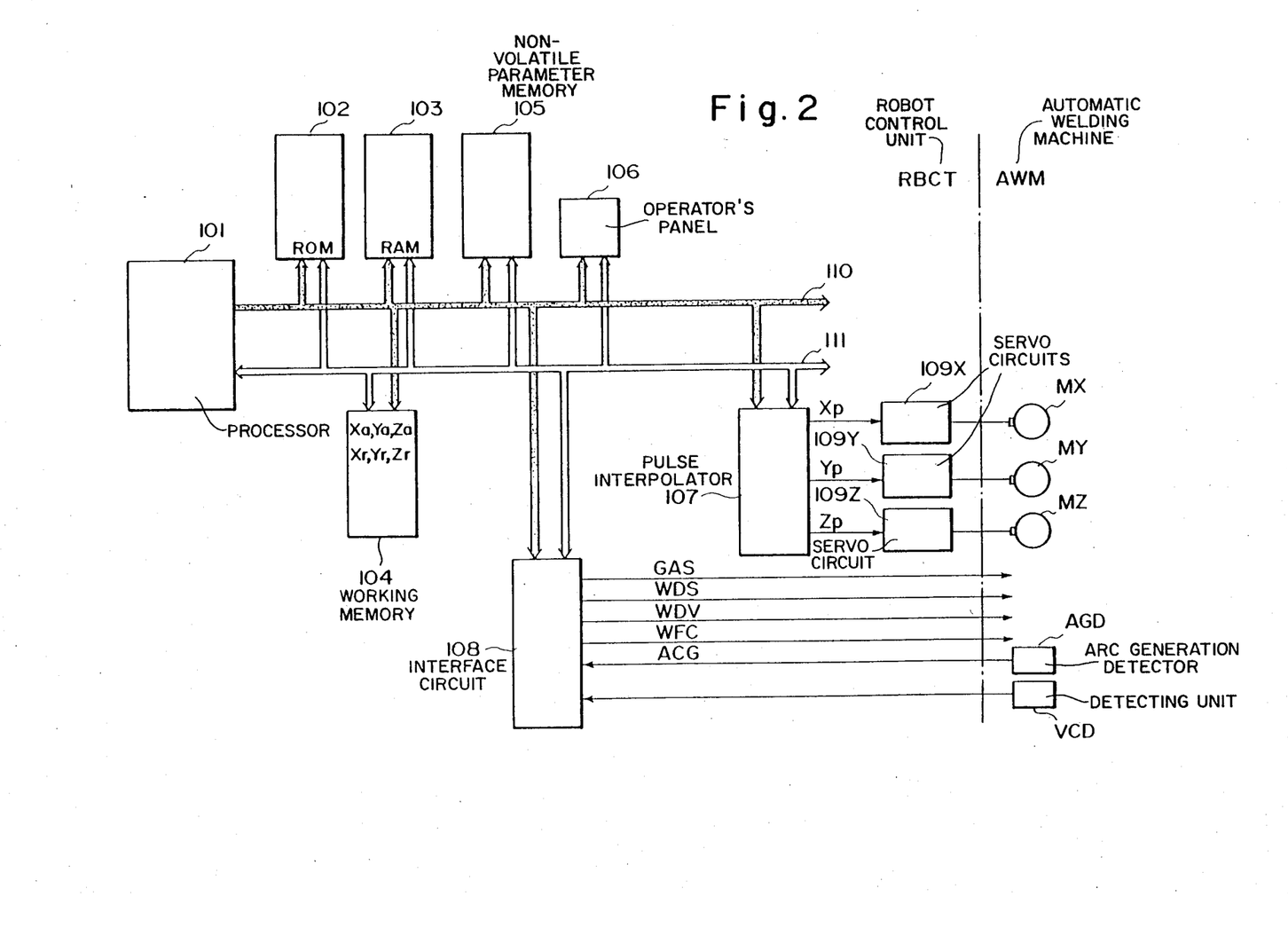
FIG. 2 is a block diagram of an embodiment of the present invention.

In FIG. 2, RBCT denotes a robot control unit, and AWM represents an automatic welding machine. The robot control unit RBCT includes a processor 101, a ROM (read-only memory) 102 storing a control program, a RAM (random-access memory) 103 in which a series of robot command data are stored a working memory 104, a non-volatile parameter memory 105 in which a number of welding conditions are stored, an operator's panel 106, a pulse interpolator 107, an interface circuit 108 for administering an exchange of signals between the processor 101 and the automatic welding machine AWM, and servo circuits 109X, 109Y, 109Z for the respective axes. Further, numerals 110, 111 designate address and data buses, respectively.

RAM 103 stores robot command data. Assume that these robot command data are to (a) move the torch TC in a rapid-traverse mode from an initial position, not shown, to a point $P_o$ shown in FIG. 5, (b) position the torch from the point $P_o$ to a welding starting point $P_1$, and (c) transport the torch TC linearly to perform welding from the welding starting point $P_1$ to a welding end point $P_2$ at a speed $f_1$, and subsequently position the torch at a point $P_3$. The robot command data will then be represented by the following:

G00 $P_o'$;

G00 $P_1'$ S45, a;

G01 $Ff_1$ $P_2'$ S46, a';

G00 $P_3'$;

...

Figure 5:
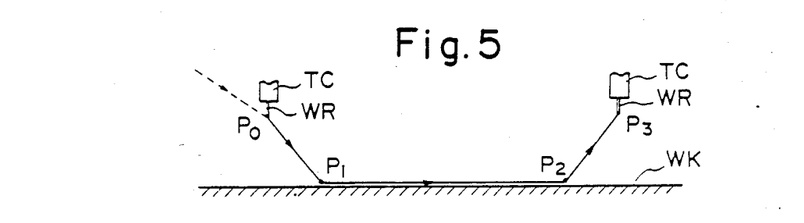
FIG. 5 illustrates the robot control data.

In the program, the data points $P_o'$, $P_1'$, $P_2'$, $P_3'$ are positional coordinate values in a robot coordinate system, of the respective points $P_o$ through $P_3$ shown in FIG. 5, "G00" is a G-function instruction indicative of positioning, "G01" is a G-function instruction indicative of path control along a straight line, the letter of the alphabet "F" is a word address word indicating that the numerical value $f_1$ following it is feed speed, "S45" is an S code designating the start of welding, "S46" is an S code designating the end of welding, and a, a' are operands (index numbers) for selecting welding conditions which are described below.

Figure 6:
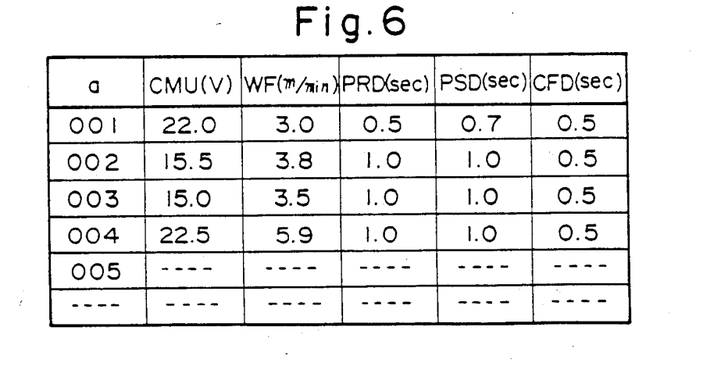
FIG. 6 illustrates the correspondence between operands and welding conditions.

The parameter memory 105 stores 32 sets of welding conditions, together with operands (index numbers). A single set of welding conditions comprises (1) welding voltage CMU (V), (2) wire feed speed WF (m/min) or welding current (A), (3) preflow duration PRD (sec), (4) postflow duration PSD (sec), and (5) crater processing duration CFD (sec). Welding voltage CMU is that produced by the welding power supply PS of FIG. 1. Wire feed speed WF is the speed at which the wire WR is laid out by the feed rollers FR of FIG. 1. Since wire feed speed and welding current are mutually proportional, either may be specified. For ease of control, however, the wire feed speed generally is specified as one of the welding conditions. Preflow duration PRD is the length of time gas is expelled from the gas supply unit toward the portion to be welded before the welding voltage is produced. Postflow duration PSD is the length of time the gas is expelled toward the welded portion after welding has ended. Crater processing duration CFD is the length of time needed to drop a molten portion of the wire into a crater which is formed at the end of welding, in order to fill the crater. FIG. 6 illustrates the correspondence between operands (index numbers) and welding conditions (CMU, WF, PRD, PSD, CFD), which are stored in the parameter memory 105. Welding conditions at the start and end of welding are selected by attaching a desired operand a to the S code (S45) which designates the start of welding, and to the S code (S46) which designates the end of welding.

Processing for a welding method according to the present invention will now be described.

(a) When a start button, not shown, on the operator's panel 106 is pressed, the processor 101 is placed under the control of the control program to read one block of robot command data out of the RAM 103.

(b) The processor 101 then determines whether the block of robot command data is path control data.

(c) If the robot command data contain path control data, the processor 101 calculates traveling distances (incremental values) $X_i$, $Y_i$, $Z_i$ along the respective axes.

Though the robot shall be described as operating in a cartesian coordinate system, a cylindrical or articulate-type coordinate system may be used. Next, the processor 101 uses the incremental values $X_i$, $Y_i$, $Z_i$ along the respective axes and feed speed F to perform the following operations:

$$\Delta X_i = F_x \cdot \Delta T \tag{1a}$$

$$\Delta Y_i = F_y \cdot \Delta T \tag{1b}$$

$$\Delta Z_i = F_z \cdot \Delta T \tag{1c}$$

thereby obtaining traveling distances $\Delta X_i$, $\Delta Y_i$, $\Delta Z_i$ along the X, Y and Z axes over a predetermined period of time $\Delta T$. The processor applies these values as inputs to the pulse interpolator 107 every $\Delta T$ sec. It should be noted that $\Delta T$ is a period of time preset as a parameter in the parameter memory 105. Also, $F_x$, $F_y$, $F_z$ are speeds, which are determined from the following equations, along the respective X, Y and Z axes:

$$F_x = F \cdot X_i / \sqrt{X_i^2 + Y_i^2 + Z_i^2} \tag{2a}$$

$$F_y = F \cdot Y_i / \sqrt{X_i^2 + Y_i^2 + Z_i^2} \tag{2b}$$

$$F_z = F \cdot Z_i / \sqrt{X_i^2 + Y_i^2 + Z_i^2} \tag{2c}$$

Upon receiving the inputs of $\Delta X_i$, $\Delta Y_i$, $\Delta Z_i$, the pulse interpolator 107 performs a pulse interpolation operation and applies interpolated pulses $X_p$, $Y_p$, $Z_p$ to the X-, Y- and Z-axis servo units 109X, 109Y, 109Z, whereby servomotors MX, MY, MZ are rotated to transport a robot, not shown, along a commanded path. As a result, the torch (wire tip), which is grasped by the robot, is moved along a welding path to perform welding. The processor 101, in accordance with the following formulae, updates the present position $X_a$, $Y_a$ $Z_a$ along the respective axes every $\Delta T$ sec, $X_a$, $Y_a$ $Z_a$ having been stored in the working memory 104:

$$X_a \pm \Delta X_i \rightarrow X_a \tag{3a}$$

$$Y_a \pm \Delta Y_i \rightarrow Y_a \tag{3b}$$

$$Z_a \pm \Delta Z_i \rightarrow Z_a \tag{3c}$$

The sign depends upon the direction of movement. Similarly, in accordance with the following formulae, the processor 101 updates remaining traveling distances $X_r$, $Y_r$, $Z_r$ (the initial values of which are the incremental values $X_i$, $Y_i$, $Z_i$, respectively) every $\Delta T$ sec:

$$X_r \pm \Delta X_i \rightarrow X_r \tag{4a}$$

$$Y_r \pm \Delta Y_i \rightarrow Y_r \tag{4b}$$

$$Z_r \pm \Delta Z_i \rightarrow Z_r \tag{4c}$$

The robot is considered to have reached the target position when the following condition is established:

$$X_r = Y_r = Z_r = 0 \tag{5}$$

This is followed by execution the next process step.

(d) When the result of the decision rendered in step (b) is that the robot command data do not contain path data, or when the processing of step (c) ends, the processor 101 determines whether the robot command data contain the S code 45 or the S code 46.

(e) If the robot command data do not contain S45 or S46, then ordinary robot control processing is executed. When such processing ends, the next block of robot command data is read out of the RAM 103 and the processing described above is repeated.

(f) If the result of the decision rendered in step (d) is that the robot command data contain an S code "S45" indicative of the start of welding (signal S45R="1" is the time chart of FIG. 7), then the following processing is executed to issue signals indicative of welding conditions.

(f-1) Specifically, when the robot command data contain "S45" (i.e., when S45="1" holds), the processor 101 reads, from the parameter memory 105 into the working memory 104, the welding condition indicated by the operand which follows "S45". The processor 101 then delivers a gas supply signal GAS to the automatic welding machine AWM through the interface circuit 108 and, at the same time, measures time t which has elapsed since generation of the gas supply signal GAS. (This is a preflow start step). The gas signal GAS is issued in the following manner, with reference being had to FIG. 3. Specifically, the processor 101 delivers, over the address bus 110, an address signal assigned to an output circuit 108a. In addition, among the lines constituting the eight-bit data bus 111, the processor 101 delivers logical "1" to the line corresponding to the bit assigned to the gas supply signal. A decoder DEC1 (FIG. 3) in the output circuit 108a produces a "1" output upon recognizing the abovementioned address signal. As a result, AND gates AG11, AG12 open, whereby the "1" (high level) on the data bus is applied to a set input terminal of an R-S flip-flop FF1 through the AND gate AG11 to set the flip-flop. When the flip-flop FF1 is set, a transistor TR1 is driven into conduction to actuate a relay RL$_1$ of the automatic welding machine AWM, whereby a contact rl$_1$ of the relay is closed. As a result, a solenoid valve, not shown, is opened, whereby gas from a gas bomb is jetted through the interior of the torch toward the portion being welded. The gas will continue to be expelled toward the portion being welded until the flip-flop FF1 is turned off.

Figure 3:
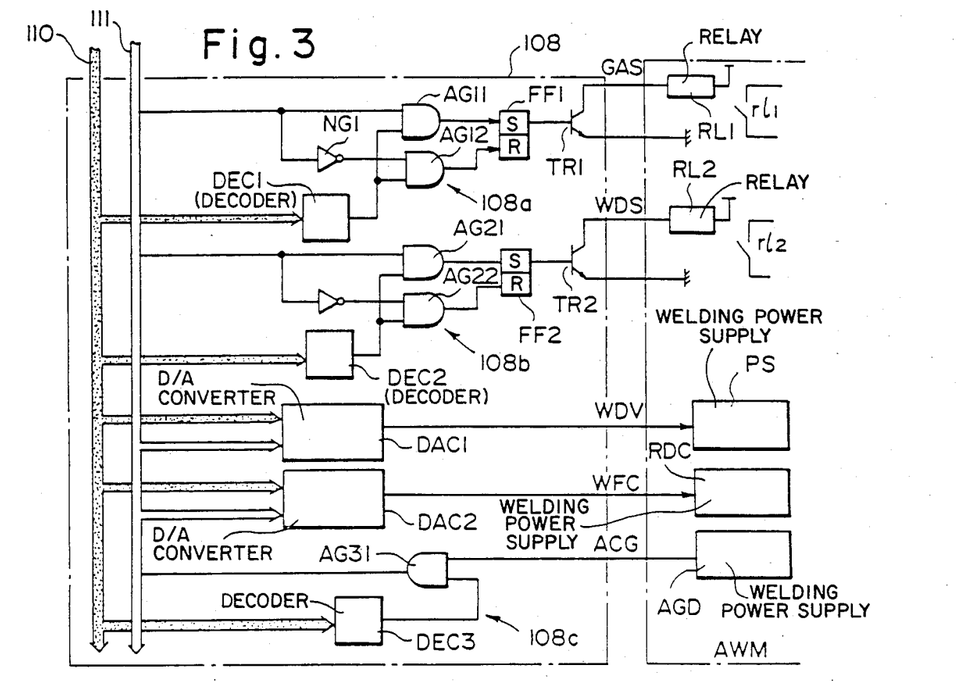
FIG. 3 illustrates an embodiment of an interface circuit in FIG. 2.
Figure 4A:
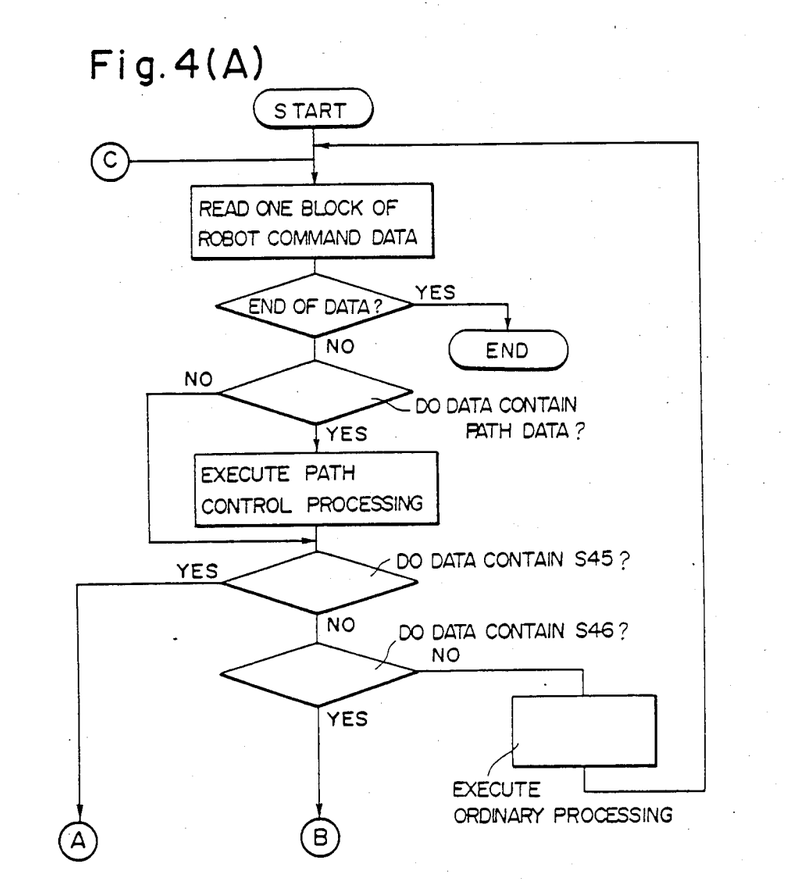
FIG. 4 is a flowchart for the processing according to the welding method of the present invention.
Figure 4B:
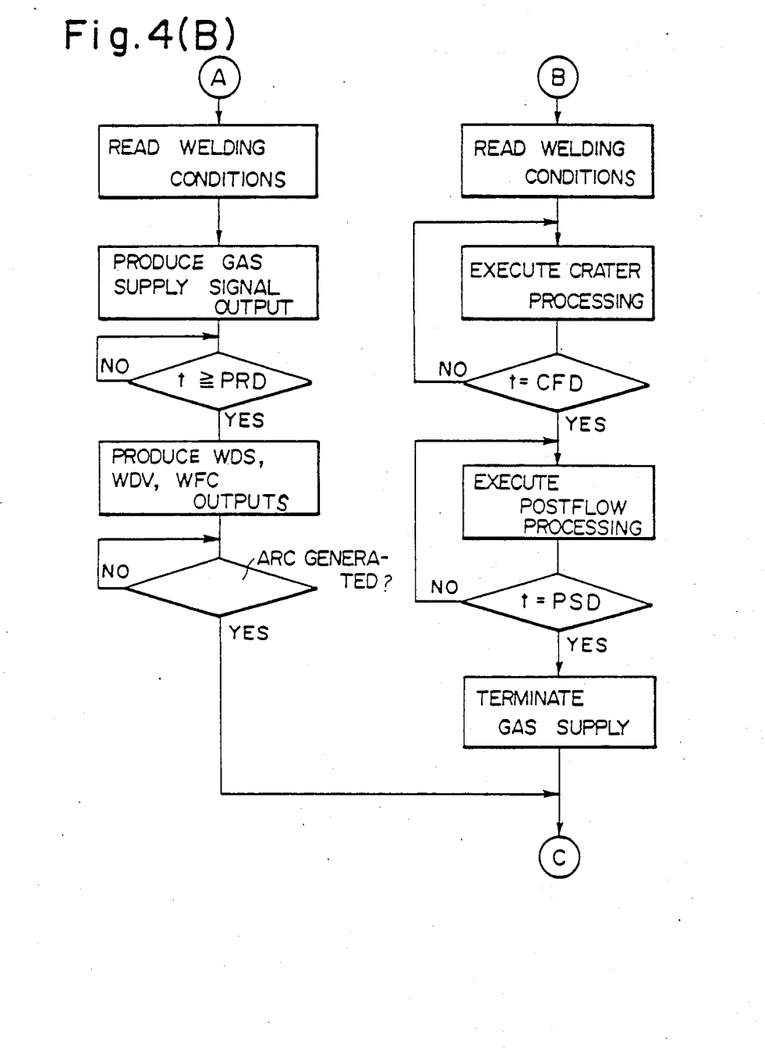

(f-2) The processor 101 performs a monitoring operation to determine whether the time t, which has elapsed since generation of the gas supply signal, has become equivalent to the preflow duration PRD read into the working memory 104. If the following relation is found to hold, namely:

t≧PRD (preflow off), then the processor delivers a welding start signal WDS, a welding voltage signal (analog voltage) WDV and a wire feed speed signal (analog voltage) WFC to the automatic welding machine AWM through an interface circuit 108. Specifically, as soon as t≧PRD is determined to hold, the processor 101 delivers over the address bus 110 an address signal assigned to a welding start signal output circuit 108b (FIG. 3). In addition, among the lines constituting the eight-bit data bus 111, the processor 101 delivers logical "1" to the line corresponding to the bit assigned to the welding start signal. A decoder DEC2 produces a "1" (high-level) output upon recognizing the abovementioned address signal, thereby opening AND gates AG21, AG22. As a result, the "1" (high level) is applied to a set input terminal of an R-S flip-flop FF2 through the AND gate AG21 to set the flip-flop. As a result, a transistor TR2 is driven into conduction to actuate a relay RL$_2$ of the automatic welding machine AWM, whereby a contact rl$_2$ of the relay is closed. This enables a welding power supply PS and a roller drive circuit RDC for driving the feed rollers.

Next, the processor 101 delivers, over the address bus 110, the address of a digital-to-analog converter (referred to as a "DA converter") DAC1. The processor also delivers, over the data bus 111, the welding voltage CMU (digital value) read into the working memory 104. As a result, after the welding voltage CMU is stored in an internal buffer register, the DA converter DAC1 converts the welding voltage into an analog voltage and delivers the same to the welding power supply PS of the automatic welding machine AWM. The welding power supply PS produces a high-voltage output proportional to the welding voltage for as long as the relay contact rl$_2$ is closed.

Thereafter, the processor 101 delivers the address of a DA converter DAC2 over the address bus 110, and delivers, over the data bus 111, the wire feed speed WF (digital value) read into the working memory 104. As a result, after the wire feed speed WF is stored in an internal buffer register, the DA converter DAC2 converts the wire feed speed into an analog voltage and applies the same to the roller drive circuit RDC of the automatic welding machine AWM. In response, the roller drive circuit RDC rotates a roller drive motor to lay out the wire WR at the commanded wire feed speed, for as long as the relay contact rl$_2$ is closed.

(f-3) When the welding power supply PS produces the welding voltage to lay out the wire WR, an arc is produce across the wire WR and the portion being welding. When an arc generation detector AGD detects generation of the arc, the detector applies an arc generation signal ACG to the interface circuit 108. The processor 101 generates the address of an arc signal read circuit 108c at a very short cycle. A decoder DEC3 therefore recognizes the address signal at the abovementioned cycle and opens an AND gate AG31 on every such occasion. As a result, when the arc generation signal ACG goes to "logical 1", this is immediately read by the processor 101.

Figure 7:
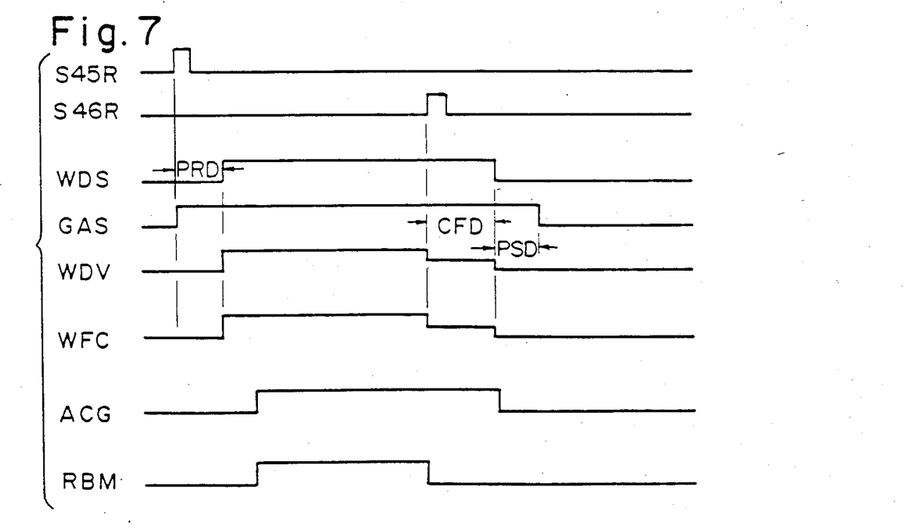
FIG. 7 is a timing diagram of various signals exchanged between a robot control unit and an automatic welding machine.

(f-4) As soon as the arc signal ACG is generated, the processor 101 reads the next block of robot command data out of the RAM 103 and repeats the processing from step (b) onward to transport the robot along the welding path (signal RBM="1" in FIG. 7).

(g) If the robot command data are found to contain the S code "S46" in the decision rendered in step (d) following arrival of the robot at the target position (i.e., if S46R="1" in FIG. 7), then the processor 101 executes the following processing to issue signals indicative of welding conditions.

(g-1) First, the processor 101 reads, from the parameter memory 105 into the working memory 104, the welding conditions indicated by the operand following "S46".

(g-2) Next, the processor 101 causes the welding voltage (analog voltage) and the wire feed speed WFC to be produced such as when "S45" is executed, and causes the automatic welding machine AWM to execute crater processing.

(g-3) The processor 101 measures the time which has elapsed since step (g-2) and performs a monitoring operation to determine whether elapsed time t has become equivalent to the crater processing duration read into the working memory 104.

(g-4) When the elapsed time t becomes equal to the crater processing duration CFD, the processor 101 resets the flip-flop FF2 (crater processing end). More specifically, for the duration of crater processing, the wire is laid out at a predetermined feed speed, and a predetermined welding voltage is impressed across the wire and the welded portion, whereby the wire is melted and a molten drop thereof is caused to fall into the crater to fill the same. As this point, crater processing ends. It should be noted that when the flop-flop FF2 is reset, the output voltage of the welding power supply PS drops to a value of zero. Moreover, the wire stops being laid out and the generation of the arc is terminated. Furthermore, the welding voltage signal WDV and wire feed speed signal WFC also fall to zero. Accordingly, from this point onward the postflow mode prevails, in which the gas is jetted toward the portion being welded.

(g-5) When t=CFD holds, the processor 101 measures the time which has elapsed since realization of this condition, and performs a monitoring operation to determine whether the elapsed time has become equivalent to the postflow duration PSD read into the working memory 104. When t=PSD is found to hold, the flip-flop FF1 is reset, thereby opening the relay $rl_1$ to stop the supply of gas (postflow processing end).

(g-6) Thereafter, the processor 101 reads the next block of robot command data out of the RAM 103 and performs processing from the above-described step (b) onward. Thereafter, the foregoing processing is repeated and, when a code indicating the end of robot command data is finally read, welding processing is ended.

There are instances where a welding activity is desired to be stopped while the activity is in progress. In such case, one need only press a hold button, not shown, on the operator's panel 106. Welding may be restarted by pressing the start button. In the present invention, pressing the hold button sends the welding voltage to 0 V and halts delivery of the wire, under which conditions the gas is jetted toward the welded portion over the postflow duration PSD (postflow processing). At restart, processing exactly the same as welding start processing in accordance with "S45" is executed. Thus, if postflow processing is executed when welding is temporarily halted and preflow processing is executed when welding is restarted, the welding state at the portion where welding has stopped is unimpaired.

Further, in the present invention, the processor 101 has a function for causing the welding machine AWM to detect the actual welding voltage and welding current, and for writing the average values thereof in the parameter memory 105. In FIG. 2, VCD denotes a detecting unit (having a detector and an AD converter). Voltage and current values (digital), which are the outputs of the detecting unit, are accepted and added up by the processor 101 via an input/output unit 108. The resulting sums are divided by welding time at the end of the welding activity, and the quuotients are stored, as the actual average welding voltage and actual average welding current, with correspondence being established between these and the selected welding conditions. By thus storing the average welding voltage and current that prevail during an actual welding activity, these may be compared with subsequent welding voltages and currents and an alarm can be issued when the difference between the compared values falls outside of upper and lower limit levels. The average voltage and current can also be utilized in correcting welding conditions (welding voltage and current) in such a manner as to achieve optmimum welding while the actual welding state is observed.

Thus, according to the present invention, the arrangement is such that a number of welding conditions are stored in memory, so that predetermined welding conditions can be selected merely by designating an operand. This facilitates the selection operation. In addition, it is unnecessary to set welding conditions on dials. This is advantageous in terms of cost since dials are no longer necessary.

The present invention allows welding conditions to be selected in a simple manner without using dials and is therefore well-suited for application to automatic welding performed by a robot.

We claim:

1. A welding method in an automatic welding machine including a memory, and in which machine welding is performed in accordance with a robot control program by impressing a voltage across a wire, which wire is transported along a welding path by a robot, and a workpiece to produce an arc at the tip of the wire, and by transporting the wire tip along the welding path by the robot while the wire is successively laid out in small increments, the method comprising the steps of:
   a. storing in the memory a correspondence between a set of index numbers and sets of welding conditions, each index number corresponding to a respective one of the sets of welding conditions;
   b. specifying a series of commands in the robot control program for controlling the robot;
   c. specifying certain of said index numbers in conjuction with appropriate commands of the robot control program so that, at the time of performing welding in accordance with the robot control program, the welding conditions specified by said index numbers will be read; and
   d. controlling the welding machine based on said welding conditions.

2. A welding method in an automatic welding machine according to claim 1, wherein welding voltage, wire feed speed, preflow duration, postflow duration and crater processing duration comprise one of said sets of welding conditions.

3. A welding method in an automatic welding machine according to claim 2, further comprising the steps of:
   starting welding in accordance with the welding voltage, wire feed speed and preflow duration of said one set of welding conditions; and
   ending welding in accordance with the welding voltage, welding current, postflow duration and crater processing duration of said one set of welding conditions.

4. A welding method in an automatic welding machine according to claim 3, further including the steps of:
   jetting a gas toward the workpiece for the preflow duration at the start of a welding operation; and then
   producing said voltage and laying the wire out to start welding.

5. A welding method in an automatic welding machine according to claim 4, further including the steps of:
 detecting the production of an arc across the wire and workpiece; and
 moving the wire along the welding path by the robot.

6. A welding method in a automatic welding machine according to claim 2, further comprising the steps of:
 moving the wire to a target position, then;
 performing crater processing at a specified welding voltage and a specified wire feed speed for the crater processing duration; and then
 performing postflow processing by jetting gas toward the workpiece for the postflow duration.

7. A welding method in an automatic welding machine according to claim 2, further including the steps of:
 receiving a request to temporarily halt a welding activity;
 holding the robot in a halted state;
 performing postflow processing;
 receiving a request to restart the welding activity; then
 performing preflow processing;
 generating a welding voltage; and
 laying out the wire to start welding.

8. A welding method in an automatic welding machine including a memory, and in which a machine wire is transported along a welding path by a robot, welding is performed under program control by applying a voltage across the wire and a workpiece to produce an arc at the tip of the wire, and the tip of the wire is transported along the welding path while the wire is laid out is small increments, the method comprising the steps of:
 a. storing blocks of robot command data including index numbers for said command data in the memory;
 b. storing in the memory a correspondence between a set of said index numbers and respective sets of welding conditions, which conditions include welding voltage, wire feed speed, preflow duration, post flow duration and crater processing duration, each index number corresponding to a respective one of the sets of welding conditions;
 c. reading a block of robot command data from the memory;
 d. determining whether or not the read block of robot command data includes data specifying the end of robot command data, and halting all operations in response to said end of data;
 e. determining whether or not the read block of robot command data includes data to move the robot;
 f. moving the robot in accordance with the read block of a robot command data to move the robot;
 g. determining whether or not the read block of robot command data includes data to initiate welding;
 h. determining whether or not the read block of robot command data includes data to stop welding;
 i. specifying certain of said index numbers in conjunction with appropriate commands of the robot control program so that, at the time of welding, a set of welding conditions specified by said index numbers will be read, if the read block of robot command data includes data to initiate welding;
 j. jetting a gas towards a portion of the workpiece to be welded in accordance with said set of welding conditions;
 k. performing welding in accordance with said set of welding conditions;
 l. detecting the generation of the arc;
 m. reading another set of welding conditions in accordance with an index number of the robot command data and in response to determining that the read block of the robot command data includes data to stop welding, performing the following steps using this set of welding conditions
  i. performing crater processing;
  ii. performing postflow processing;
  iii. terminating the jetting of the gas; and
 n. repeating steps b. thru m.

* * * * *

UNITED STATES PATENT AND TRADEMARK OFFICE
CERTIFICATE OF CORRECTION

PATENT NO.  : 4,647,753

DATED       : March 3, 1987

INVENTOR(S) : Nakashima et al.

It is certified that error appears in the above-identified patent and that said Letters Patent is hereby corrected as shown below:

| | | |
|---|---|---|
| Front Page, | [73] | "Ltd." should be --Ltd--; |
| ABSTRACT, | [57] | line 8, "memory" should be --memory;--;<br>line 12, "program," should be --program;--. |
| Column 5, | | line 39, "$Rl_1$" should be --$r\ell_1$--. |
| Column 6, | | line 6, "$rl_2$" should be --$r\ell_2$--; |
| | | line 21, "$rl_2$" should be --$r\ell_2$--; |
| | | line 34, "$rl_2$" should be --$r\ell_2$--. |
| Column 7, | | line 30, "$rl_1$" should be --$r\ell_1$--; |
| | | line 64, "quuotients" should be --quotients--. |

Signed and Sealed this

Fifteenth Day of September, 1987

Attest:

DONALD J. QUIGG

*Attesting Officer*    *Commissioner of Patents and Trademarks*